United States Patent
Jeong et al.

(10) Patent No.: US 9,936,437 B2
(45) Date of Patent: Apr. 3, 2018

(54) METHOD AND DEVICE FOR TRANSMITTING DATA IN WLAN SYSTEM

(71) Applicant: KT Corporation, Seongnam-si, Gyeonggi-do (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 45 days.

(21) Appl. No.: 14/909,613

(22) PCT Filed: Aug. 12, 2014

(86) PCT No.: PCT/KR2014/007473
§ 371 (c)(1),
(2) Date: Feb. 2, 2016

(87) PCT Pub. No.: WO2015/023103
PCT Pub. Date: Feb. 19, 2015

(65) Prior Publication Data
US 2016/0183161 A1    Jun. 23, 2016

(30) Foreign Application Priority Data
Aug. 12, 2013 (KR) .................. 10-2013-0095654

(51) Int. Cl.
*H04W 40/22* (2009.01)
*H04W 8/26* (2009.01)
(Continued)

(52) U.S. Cl.
CPC ............. *H04W 40/22* (2013.01); *H04W 8/26* (2013.01); *H04L 5/0044* (2013.01); *H04W 28/06* (2013.01);
(Continued)

(58) Field of Classification Search
CPC ....... H04W 40/22; H04W 8/26; H04W 28/06; H04W 76/021; H04W 72/04; H04W 88/04; H04W 84/12; H04L 5/0044
See application file for complete search history.

(56) References Cited

U.S. PATENT DOCUMENTS 8,179,867 B2 * 5/2012 Seok .................. H04W 74/0816
370/336
9,125,105 B2 * 9/2015 Kwon .................. H04W 28/16
(Continued)

FOREIGN PATENT DOCUMENTS
WO      2013/012263 A1    1/2013

OTHER PUBLICATIONS

IEEE 802.11. "Relays for 802.11ah", IEEE 802.11-12/1323r0, Nov. 12, 2012, 14 pages, (https://mentor.ieee.org/802.11/dcn/12/11-12-1323-00-00ah-relay.pptx).
(Continued)

*Primary Examiner* — Brian O'Connor
(74) *Attorney, Agent, or Firm* — Sughrue Mion, PLLC

(57) ABSTRACT

Disclosed are a method and a device for transmitting data in a WLAN system. The method for transmitting data comprising the steps of: assigning a relay device an R-BSS AID resource for being allocated to a terminal connected an R-BSS from a main access point; and allocating, by the relay device, an AID to the terminal connected to the R-BSS within the R-BSS AID resource.

12 Claims, 16 Drawing Sheets

(51) Int. Cl.
  *H04W 28/06* (2009.01)
  *H04L 5/00* (2006.01)
  *H04W 76/02* (2009.01)
  *H04W 84/12* (2009.01)
  *H04W 88/04* (2009.01)
  *H04W 72/04* (2009.01)

(52) U.S. Cl.
  CPC .......... *H04W 72/04* (2013.01); *H04W 76/021* (2013.01); *H04W 84/12* (2013.01); *H04W 88/04* (2013.01)

(56) References Cited

U.S. PATENT DOCUMENTS

| | | | | |
|---|---|---|---|---|
| 9,220,061 B2 * | 12/2015 | Kim | | H04W 52/0229 |
| 9,538,368 B2 * | 1/2017 | Seok | | H04W 74/04 |
| 9,585,057 B2 * | 2/2017 | Seok | | H04W 28/06 |
| 2007/0230423 A1 * | 10/2007 | Yoshida | | H04W 76/02 |
| | | | | 370/338 |
| 2014/0056209 A1 * | 2/2014 | Park | | H04W 16/26 |
| | | | | 370/315 |
| 2014/0146809 A1 * | 5/2014 | Xing | | H04W 4/08 |
| | | | | 370/338 |
| 2015/0156672 A1 * | 6/2015 | Seok | | H04W 28/06 |
| | | | | 370/338 |
| 2015/0244448 A1 * | 8/2015 | Seok | | H04W 48/12 |
| | | | | 370/315 |
| 2015/0327262 A1 * | 11/2015 | Kwon | | H04W 72/0446 |
| | | | | 370/329 |
| 2015/0381676 A1 * | 12/2015 | Seok | | H04W 4/06 |
| | | | | 370/315 |
| 2016/0044711 A1 * | 2/2016 | Lou | | H04W 74/0816 |
| | | | | 370/338 |

OTHER PUBLICATIONS

Minyoung Park, "Specification Framework for TGah", IEEE 802.11-11/1137r15, May 14, 2013, 76 pages, (https://mentor.ieee.org/802.11/dcn/11/11-11-1137-15-00ah-specification-framework-for-tgah.docx).

IEEE 802.11, "Two-Hop Relay Function", IEEE 802.11-12/1330r0, Nov. 12, 2012, 27 pages, (https://mentor.ieee.org/802.11/dcn/12/11-12-1330-00-00ah-two-hop-relaying.pptx).

IEEE 802.11, "Impilcit ACK for Relay", IEEE 802.11-13/0075r0, Jan. 14, 2013, 11 pages, (https://mentor.ieee.org/802.11/dcn/13/11-13-0075-00-00ah-implicit-ack-for-relay.pptx).

International Search Report for PCT/KR2014/007473 dated Dec. 9, 2014 [PCT/ISA/210].

Written Opinion for PCT/KR2014/007473 dated Dec. 9, 2014 [PCT/ISA/237].

* cited by examiner

FIG. 6

| ELEMENT ID | LENGTH | DTIM COUNT | DTIM PERIOD | BITMAP CONTROL | PARTIAL VIRTUAL BITMAP |
|---|---|---|---|---|---|
| 1 | 1 | 1 | 1 | 1 | 1-251 |

OCTET:

METHOD AND DEVICE FOR TRANSMITTING DATA IN WLAN SYSTEM

TECHNICAL FIELD

The present invention generally relates to data transmission technology in a wireless local area network (WLAN) system and, more particularly, to a method and apparatus for transmitting data to an end terminal in a WLAN system including a relay device.

BACKGROUND ART

With the development of information and communication technology, various wireless communication technologies have been developed. Among these technologies, a wireless local area network (WLAN) denotes technology for allowing wireless access to the Internet in homes, businesses or specific service areas using a mobile terminal such as a personal digital assistant (PDA), a laptop computer, a portable multimedia player (PMP), a smart phone, or a tablet PC, based on radio frequency (RF) technology.

Standards for WLAN technology have been developed as Institute of Electrical and Electronics Engineers (IEEE) 802.11 standards. WLAN technology conforming to the IEEE 802.11a standard is operated based on an orthogonal frequency division multiplexing (OFDM) scheme, and is capable of providing a maximum data rate of 54 Mbps in a 5 GHz band. WLAN technology conforming to the IEEE 802.11b standard is operated based on a direct sequence spread spectrum (DSSS) scheme, and is capable of providing a maximum data rate of 11 Mbps in a 2.4 GHz band. WLAN technology conforming to the IEEE 802.11g standard is operated based on the OFDM or DSSS scheme, and is capable of providing a maximum data rate of 54 Mbps in a 2.4 GHz band.

WLAN technology conforming to the IEEE 802.11n standard is operated based on the OFDM scheme in a 2.4 GHz band and a 5 GHz band, and is capable of providing a maximum data rate of 300 Mbps for four spatial streams when a Multiple-Input Multiple-Output OFDM (MIMO-OFDM) scheme is used. WLAN technology conforming to the IEEE 802.11n standard may support a channel bandwidth of up to 40 MHz and is capable of providing a maximum data rate of 600 Mbps in that case.

As the popularization of such WLAN technology has been activated and applications using WLANs have been diversified, the requirement for new WLAN technology that supports throughput higher than that of existing WLAN technology is increasing. Very high throughput (VHT) WLAN technology is proposed technology that supports a data rate of 1 Gbps or more. Meanwhile, in a system based on such WLAN technology, a problem arises in that, as the distance between WLAN devices increases, communication efficiency is deteriorated.

DISCLOSURE

Technical Problem

An object of the present invention to solve the above problems is to provide a data transmission method for improving the efficiency of a WLAN system.

Another object of the present invention to solve the above problems is to provide a data transmission apparatus for improving the efficiency of a WLAN system.

Technical Solution

A communication system based on WLAN technology includes a certain terminal acting as a relay device for relaying data transmitted between a master access point and an end terminal.

In accordance with an embodiment of the present invention to accomplish the above objects, there is provided a method for data transmission for relaying frame transmissions using a relay device between a master access point and a terminal, wherein the master access point forms a master-basic service set (M-BSS) to serve a terminal, and the relay device forms a relay-basic service set (R-BSS) to serve a terminal, and is associated with the master access point to relay frame transmissions between the master access point and a terminal belonging to the R-BSS, the method including receiving, by the relay device from the master access point, assignment of R-BSS association identifier (AID) resources to be allocated to a terminal associated to the R-BSS, and allocating, by the relay device, an AID among the R-BSS AID resources to the terminal associated to the R-BSS.

Here, the R-BSS AID resources may not overlap M-BSS AID resources to be allocated by the master access point to a terminal associated to the M-BSS.

Here, receiving, from the master access point, the assignment of R-BSS AID resources further may further include transmitting, by the relay device, an association request frame that requests allocation of the R-BSS AID resources to the master access point, and receiving, by the relay device, an association response frame including an R-BSS AID resource allocation response, as a response to the association request frame, from the master access point.

Here, receiving, from the master access point, the assignment of R-BSS AID resources may further include, after the relay device has been associated with the master access point, transmitting an R-BSS AID resource request frame that requests allocation of the R-BSS AID resources to the master access point, and receiving an R-BSS AID resource response frame, as a response to the R-BSS AID resource request frame, from the master access point.

Here, receiving, from the master access point, the assignment of R-BSS AID resources may further include receiving, by the relay device, reference AID information from the master access point, and deriving, by the relay device, R-BSS AID resources using the reference AID information.

Here, the reference AID may be an AID of the relay device.

Here, the deriving the R-BSS AID resources may include, when the reference AID is set on a page ID basis, deriving a range of R-BSS AID resources allocated to the relay device within a page ID range indicated by the reference AID.

Here, the deriving the R-BSS AID resources may include, when the reference AID is set on a block index basis, deriving a range of R-BSS AID resources allocated to the relay device within a block index range indicated by the reference AID.

Here, the deriving the R-BSS AID resources may include, when the reference AID is set on a sub-block index basis, deriving a range of R-BSS AID resources allocated to the relay device within a sub-block index range indicated by the reference AID.

Here, the data transmission method may further include transmitting, by the relay device, information about an AID allocated to the terminal associated to the R-BSS and a medium access control (MAC) address of the terminal to the master access point.

Here, the data transmission method may further include receiving a data frame from the master access point, and transmitting the data frame to a first terminal, when a source address (SA) field included in the data frame indicates a MAC address of the master access point, a destination address (DA) field indicates a MAC address of the first terminal belonging to a BSS of the relay device, a receiver address (RA) field indicates an AID of the relay device, and a transmitter address (TA) field indicates a MAC address of the master access point.

Here, the data transmission method may further include receiving a data frame from the master access point, and transmitting the data frame to a first terminal, when an SA field included in the data frame indicates a MAC address of the master access point, a DA field indicates an AID of the first terminal belonging to a BSS of the relay device, an RA field indicates a MAC address of the relay device, and a TA field indicates a MAC address of the master access point.

Here, the data transmission method may further include receiving a data frame from the master access point, and transmitting a data frame to a first terminal, when an SA field included in the data frame indicates a MAC address of the master access point, a DA field indicates an AID of the first terminal belonging to a BSS of the relay device, an RA field indicates an AID of the relay device, and a TA field indicates a MAC address of the master access point.

Advantageous Effects

In accordance with the present invention, the wireless transmission efficiency of a WLAN system can be improved.

DESCRIPTION OF DRAWINGS

FIG. 6 is a block diagram showing an embodiment of the structure of a TIM information element (IE);

BEST MODE

Figure 1:
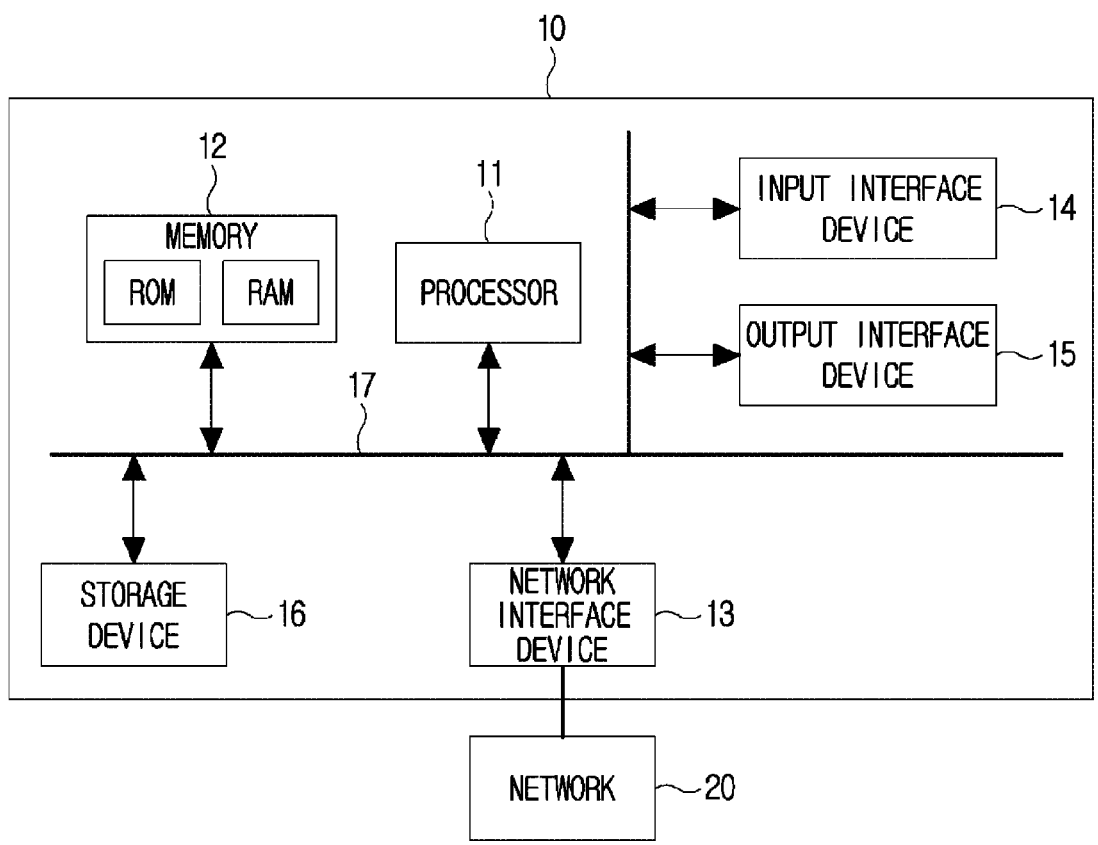
FIG. 1 is a block diagram showing an embodiment of a station for performing methods according to the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms such as "first" and "second" may be used to describe various components, but those components should not be limited by the terms. The terms are merely used to distinguish one component from other components. A first component may be designated as a second component and a second component may be designated as a first component in the similar manner, without departing from the scope based on the concept of the present invention. The term "and/or" includes a combination of a plurality of related items or any of the plurality of related items.

It should be understood that a representation indicating that a first component is "connected" or "coupled" to a second component may include the case where the first component is connected or coupled to the second component with some other component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Hereinafter, preferred embodiments of the present invention will be described in detail with reference to the attached drawings. For easy understanding of the entire part of the invention in the following description of the present invention, the same reference numerals are used to designate the same or similar elements throughout the drawings, and repeated descriptions of the same components will be omitted.

Throughout the present specification, a station (STA) denotes any functional medium that includes medium access control (MAC) conforming to the IEEE 802.11 standards and a physical layer interface for a wireless medium. Stations may be classified into a station (STA) that is an access point (AP) and a station (STA) that is a non-AP. The station that is an AP may be simply called an access point (AP), and the station that is a non-AP may be simply called a terminal.

A 'station (STA)' may include a processor and a transceiver, and may further include a user interface, a display device, etc. The processor denotes a unit devised to generate a frame to be transmitted over a wireless network or process a frame received over the wireless network, and may perform various functions to control the station (STA). The transceiver denotes a unit that is functionally connected to the processor and is devised to transmit and receive a frame over the wireless network for the station (STA).

An 'access Point (AP)' may denote a centralized controller, a base station (BS), a radio access station, a Node B, an evolved Node B, a relay, a Mobile Multihop Relay (MMR)-BS, a Base Transceiver System (BTS), a site controller, etc., and may include some or all of the functions thereof.

A 'terminal (i.e. non-AP)' may denote a Wireless Transmit/Receive Unit (WTRU), User Equipment (UE), a User Terminal (UT), an Access Terminal (AT), a Mobile Station (MS), a mobile terminal, a subscriber unit, a Subscriber Station (SS), a wireless device, a mobile subscriber unit, etc., and may include some or all of the functions thereof.

Here, the terminal may denote a desktop computer capable of communication, a laptop computer, a tablet PC, a wireless phone, a mobile phone, a smart phone, a smart watch, smart glasses, an e-book reader, a Portable Multimedia Player (PMP), a portable game console, a navigation device, a digital camera, a Digital Multimedia Broadcasting (DMB) player, a digital audio recorder, a digital audio player, a digital picture recorder, a digital picture player, a digital video recorder, a digital video player, etc.

FIG. 1 is a block diagram showing an embodiment of a station for performing methods according to the present invention.

Referring to FIG. 1, a station 10 may include at least one processor 11, memory 12, and a network interface device 13 connected to a network 20 and configured to perform communication. The station 10 may further include an input interface device 14, an output interface device 15, and a storage device 16. The components included in the station 10 may be connected to each other through a bus 17, and may then perform communication with each other.

The processor 11 may execute program instructions stored in the memory 12 and/or the storage device 16. The processor 11 may denote a central processing unit (CPU), a graphics processing unit (GPU), or an exclusive processor for performing the methods according to the present invention. Each of the memory 12 and the storage device 16 may be implemented as a volatile storage medium and/or a nonvolatile storage medium. For example, the memory 12 may be implemented as read only memory (ROM) and/or random access memory (RAM).

The embodiments of the present invention are applied to a WLAN system conforming to the IEEE 802.11 standards, and may also be applied to other communication systems as well as the WLAN system conforming to the IEEE 802.11 standards.

For example, the embodiments of the present invention may be applied to the mobile Internet such as a Wireless Personal Area Network (WPAN), a Wireless Body Area Network (WBAN), Wireless Broadband Internet (WiBro), or Worldwide Interoperability for Microwave Access (Wimax), a second generation (2G) mobile communication network such as a Global System for Mobile communication (GSM) or Code Division Multiple Access (CDMA), a 3G mobile communication network such as Wideband Code Division Multiple Access (WCDMA) or CDMA2000, a 3.5G mobile communication network such as High-Speed Downlink Packet Access (HSDPA) or High-Speed Uplink Packet Access (HSUPA), a 4G mobile communication network such as Long-Term Evolution (LTE) or LTE-Advanced, or a 5G mobile communication network.

Figure 2:
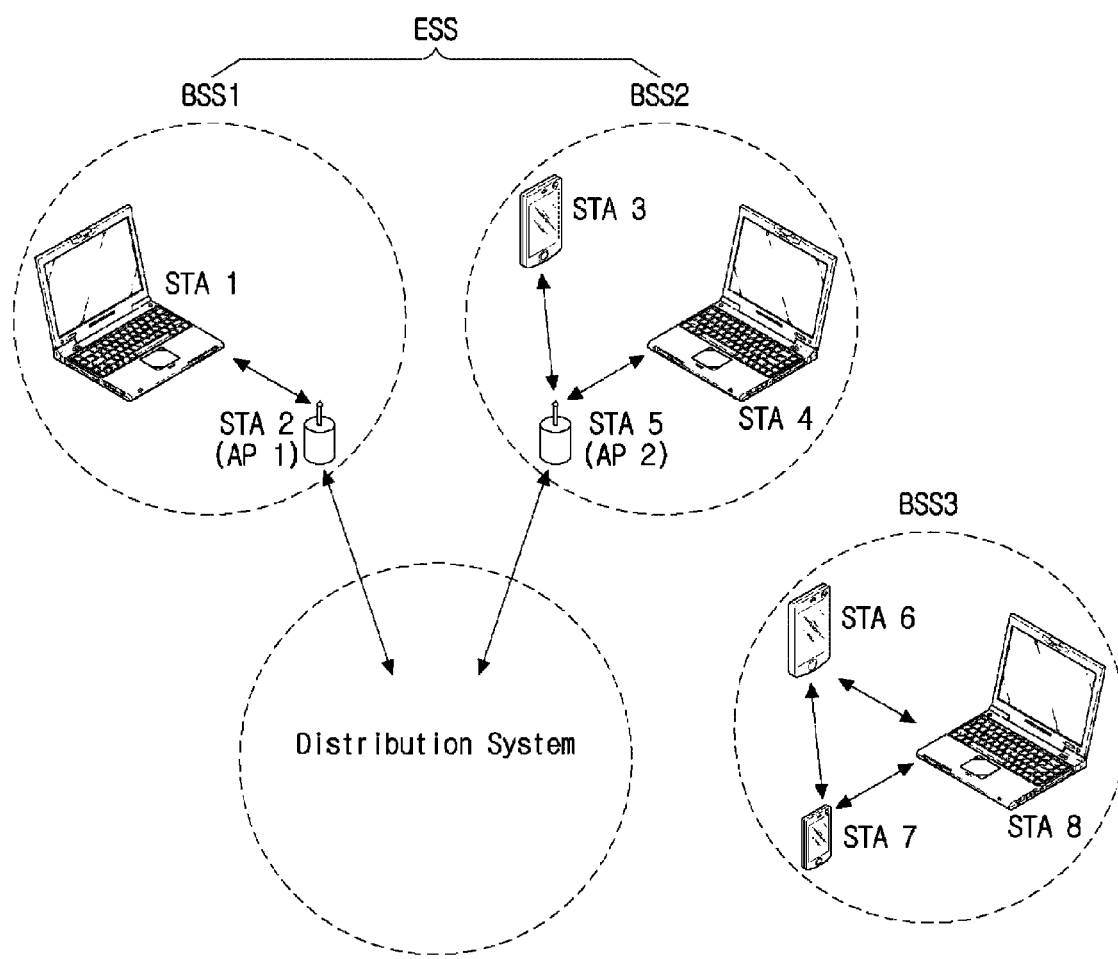
FIG. 2 is a conceptual diagram showing an embodiment of the configuration of a WLAN system conforming to IEEE 802.11.

FIG. 2 is a conceptual diagram showing an embodiment of the configuration of a WLAN system conforming to IEEE 802.11.

Referring to FIG. 2, the WLAN system conforming to IEEE 802.11 may include at least one basic service set (BSS). The BSS denotes a set of stations (STA 1, STA 2(AP 1), STA 3, STA 4, STA 5(AP 2), STA 6, STA 7, STA 8) which are successfully synchronized with each other and are capable of communicating with each other, and is not a concept meaning a specific area.

BSSs may be classified into an infrastructure BSS and an independent BSS (IBSS). Here, BSS 1 and BSS 2 denote infrastructure BSSs and BSS 3 denotes an IBSS.

BSS 1 may include a first terminal STA 1, a first access point STA 2 (AP 1) for providing a distribution service, and a distribution system (DS) for connecting multiple access points STA 2(AP 1) and STA 5(AP 2) to each other. In BSS 1, the first access point STA 2 (AP 1) may manage the first terminal STA 1.

BSS 2 may include a third terminal STA 3, a fourth terminal STA 4, a second access point STA 5 (AP 2)) for providing a distribution service, and a distribution system (DS) for connecting the multiple access points STA 2(AP 1) and STA 5(AP 2) to each other. In the BSS 2, the second access point STA 5 (AP 2) may manage the third terminal STA 3 and the fourth terminal STA 4.

BSS 3 denotes an IBSS operating in an ad-hoc mode. In the BSS 3, there is no access point that functions as a centralized management entity. That is, in the BSS 3, terminals STA 6, STA 7, and STA 8 are managed in a distributed manner. In the BSS 3, all of the terminals STA 6, STA 7, and STA 8 may denote mobile terminals, and access to the distribution system (DS) is not permitted, thus constituting a self-contained network.

The access points STA 2(AP 1) and STA 5(AP 2) may provide access to the distribution system (DS) via a wireless medium for the terminals STA 1, STA 3, and STA 4 associated thereto. Communication between the terminals STA 1, STA 3, and STA 4 in the BSS 1 or BSS 2 is generally performed via the access point STA 2 (AP 1) or STA 5 (AP 2), but direct communication may be performed between the terminals STA 1, STA 3, and STA 4 when a direct link is set up therebetween.

Multiple infrastructure BSSs may be connected to each other through the distribution system (DS). The multiple BSSs connected through the distribution system (DS) are called an extended service set (ESS). The entities included in the ESS, that is, STA 1, STA 2(AP 1), STA 3, STA 4, and STA 5(AP 2), are capable of communicating with each other, and any terminal STA 1, STA 3, or STA 4 may move from a single BSS to another BSS while performing seamless communication in the same ESS.

The distribution system (DS) is a mechanism for allowing one access point to communicate with another access point. In accordance with the DS, the access point may transmit frames for terminals coupled to a BSS managed thereby, or may transmit frames for any terminal that has moved to another BSS. Further, the access point may transmit and receive frames to and from an external network, such as a wired network. Such a DS is not necessarily a network and is not limited in its form as long as it is capable of providing a predetermined distribution service defined in the IEEE 802.11 standards. For example, the distribution system may be a wireless network such as a mesh network, or a physical structure for connecting the access points to each other.

Each terminal (STA) in the infrastructure BSS may be associated with an access point (AP). When associated with the access point (AP), the terminal (STA) may transmit and receive data.

Figure 3:
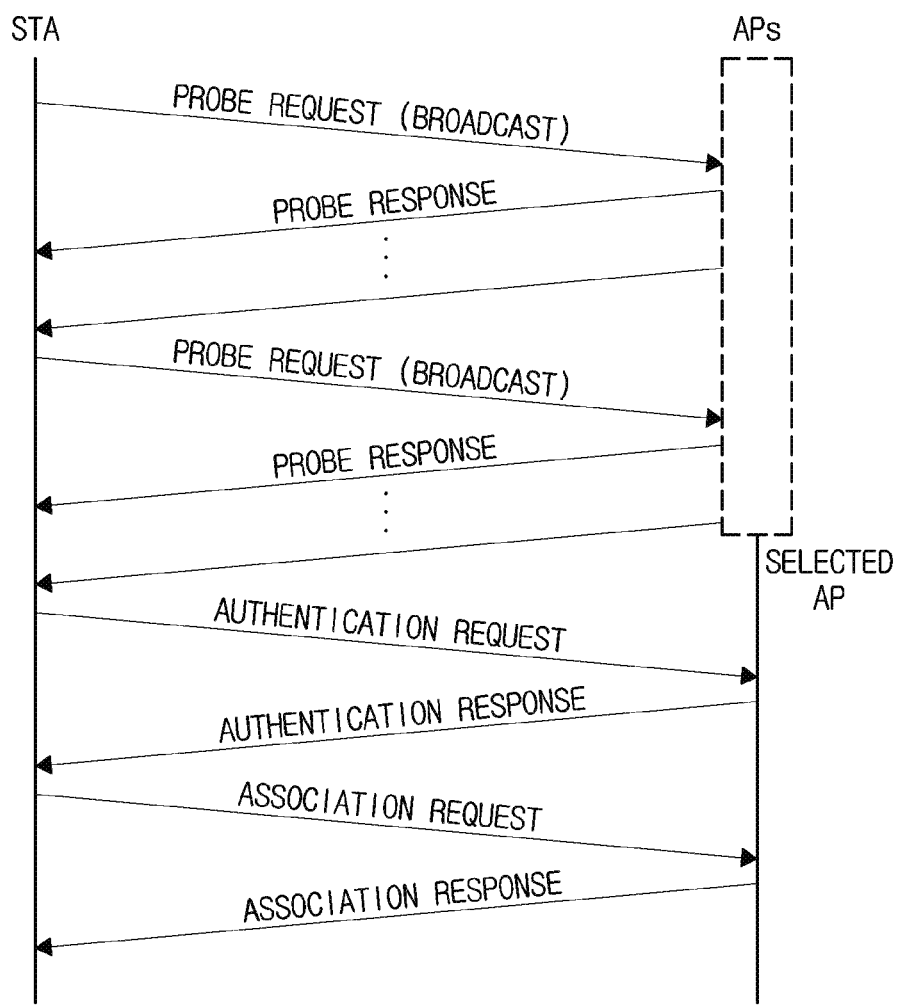
FIG. 3 is a flowchart showing a terminal association procedure in an infrastructure BSS.

FIG. 3 is a flowchart showing a terminal association procedure performed in an infrastructure BSS.

Referring to FIG. 3, the STA association procedure performed in the infrastructure IBSS may be chiefly divided into the step of probing an AP (probe step), the step of performing authentication with the probed AP (authentication step), and the step of associating with the AP with which authentication has been performed (association step).

The terminal (STA) may first probe neighboring APs using a passive scanning method or an active scanning method. When the passive scanning method is used, the terminal (STA) may probe neighboring APs by overhearing the beacons transmitted from the APs. When the active scanning method is used, the STA may probe neighboring APs by transmitting a probe request frame and receiving a probe response frame which is a response to the probe request frame from the APs.

When neighboring APs are detected, the STA may perform the step of performing authentication with each detected AP. In this case, the STA may perform the step of performing authentication with multiple APs. Authentication algorithms conforming to the IEEE 802.11 standards may be classified into an open system algorithm for exchanging two authentication frames with each other and a shared key algorithm for exchanging four authentication frames with each other.

Based on the authentication algorithms conforming to the IEEE 802.11 standards, the STA may transmit an authentication request frame and receive an authentication response frame, which is a response to the authentication request frame, from each AP, thus completing authentication with each AP.

When authentication has been completed, the STA may perform the step of associating with the AP. In this case, the STA may select a single AP from among the APs with which authentication has been performed, and may perform the step of associating with the selected AP. That is, the STA may transmit an association request frame to the selected AP and receive an association response frame, which is a response to the association request frame, from the selected AP, thus completing association with the selected AP.

The WLAN system denotes a local area network in which multiple communication entities conforming to the IEEE 802.11 standards may exchange data with each other in a wirelessly connected state.

Figure 4:
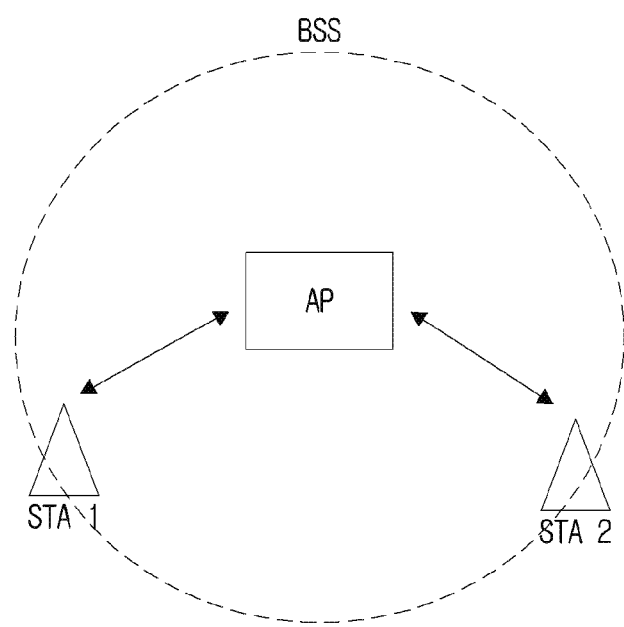
FIG. 4 is a conceptual diagram showing the infrastructure BSS of a WLAN system.

FIG. 4 is a conceptual diagram showing the infrastructure BSS of a WLAN system.

Referring to FIG. 4, the infrastructure BSS may include a single access point (AP) and multiple terminals STA 1 and STA 2. The AP may transmit a beacon frame including a service set ID (SSID), which is a unique identifier, in a broadcast manner. The beacon frame may provide information about the presence and association of the AP to terminals that are not associated with the AP, and may notify the terminals associated with the AP of the presence of data that is transmitted to a specific terminal.

Each terminal that is not associated with the AP may probe the AP using a passive scanning method or an active scanning method, and may acquire association information from the probed AP. In the case of the passive scanning method, the terminal may probe the AP by receiving a beacon frame from the AP. In the case of the active scanning method, the terminal may probe the AP by transmitting a probe request frame and receiving a probe response frame, which is a response thereto, from the AP.

Each terminal that is not associated with the AP may attempt to perform authentication with a specific AP based on association information acquired from the beacon frame or the probe response frame. A terminal that has succeeded in authentication may transmit an association request frame to the corresponding AP, and the AP, having received the association request frame, may transmit an association response frame including the AID of the terminal to the terminal. Via the above procedure, the terminal may be associated with the AP.

Figure 5:
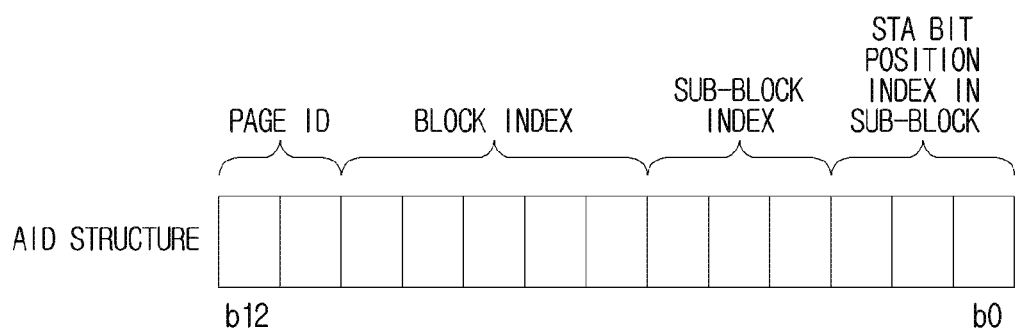
FIG. 5 is a block diagram showing an embodiment of a hierarchical AID structure.

FIG. 5 is a block diagram showing an embodiment of a hierarchical AID structure.

Referring to FIG. 5, in the IEEE 802.11 standards, an AID having a hierarchical structure may be used to efficiently manage multiple terminals. An AID assigned to a single terminal may be composed of a page ID, a block index, a sub-block index, and a terminal bit index (STA bit index). The group to which the terminal belongs (i.e. a page group, a block group, or a sub-block group) may be identified using information about individual fields.

FIG. 6 is a block diagram showing an embodiment of the structure of a traffic indication map (TIM) information element (IE).

Referring to FIG. 6, the TIM IE may include an element ID field, a length field, a delivery traffic indication message (DTIM) count field, a DTIM period field, a bitmap control field, and a partial virtual bitmap field. That is, the TIM IE includes information required to indicate a bit corresponding to the AID of a terminal when data to be transmitted to the terminal is buffered in the AP, and this information may be encoded into the bitmap control field and the partial virtual bitmap field.

Figure 7:
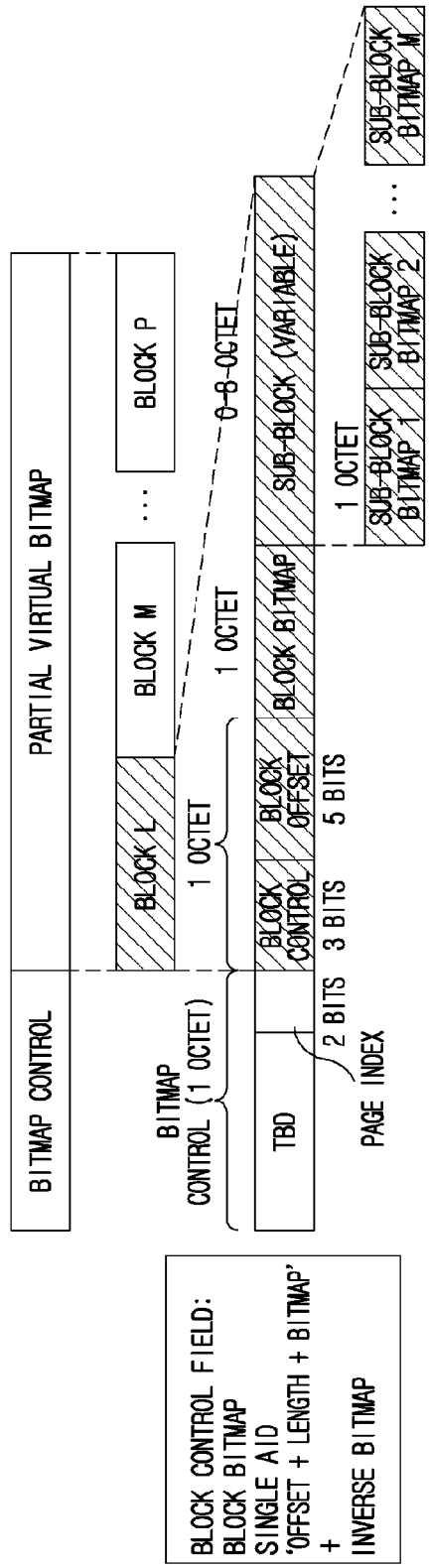
FIG. 7 is a block diagram showing an embodiment of the structure of a TIM encoded on a block basis.

FIG. 7 is a block diagram showing an embodiment of the structure of a TIM encoded on a block basis.

Referring to FIG. 7, in the IEEE 802.11 standards, the TIM may be encoded on a block basis. A single encoding block may include a block control field, a block offset field, a block bitmap field, and at least one sub-block field.

The block control field may denote the encoding mode of the TIM. That is, the block control field may represent a block bitmap mode, a single AID mode, an offset+length+bitmap (OLB) mode, or an inverse bitmap mode. The block offset field may represent the offset of an encoded block. The block bitmap field may represent a bitmap indicating the location of the sub-block in which an AID bit is set. The sub-block bitmap field may represent a bitmap indicating the location of an AID in the sub-block.

Figure 8:
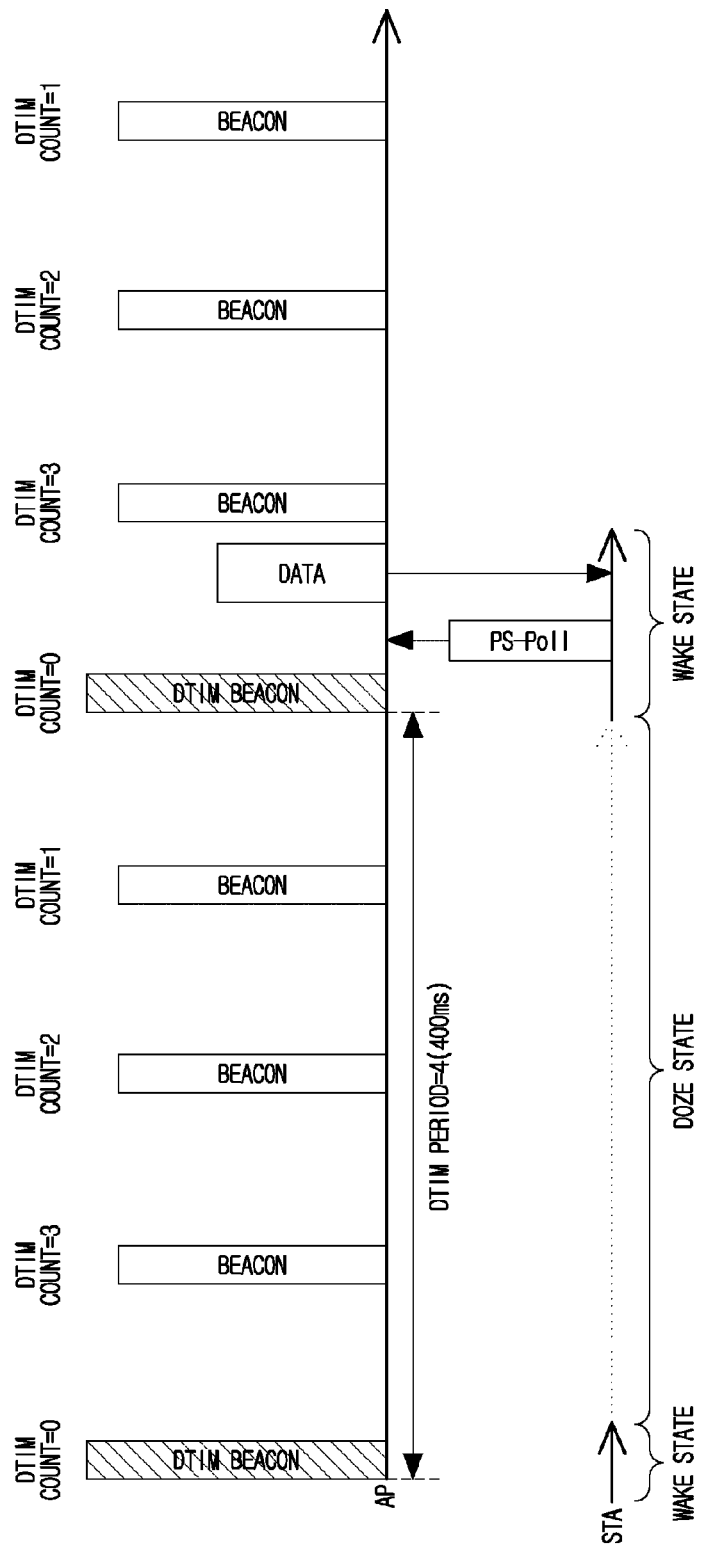
FIG. 8 is a flow diagram showing an embodiment of a data transmission/reception procedure.

FIG. 8 is a flow diagram showing an embodiment of a data transmission/reception procedure.

Referring to FIG. 8, an access point (AP) may transmit a beacon frame including a TIM IE in a broadcast manner. A terminal (STA) operating in a power saving mode (PSM)

may be awakened at intervals of a beacon period, in which a DTIM count becomes 0, and may receive a beacon frame. The terminal (STA) is configured to, when a bit corresponding to its AID is set to '1' in the TIM included in the received beacon frame, transmit a power save (PS)-Poll frame to the AP, thus notifying the AP that the STA is ready to receive data. Upon receiving the PS-Poll frame, the AP may transmit a data frame to the corresponding STA.

In the WLAN system, communication entities (i.e. access points, terminals, etc.) share a wireless channel and contend with other entities to access the wireless channel based on a carrier sense multiple access (CSMA)/collision avoidance (CA) scheme. First, each communication entity may check the occupied state of the wireless channel using a physical channel sensing scheme and a virtual channel sensing scheme before accessing the wireless channel.

The physical channel sensing scheme may be implemented via channel sensing, which detects whether energy of a predetermined level or more is present in the wireless channel. When energy of a predetermined level or more is detected using the physical channel sensing scheme, the terminal may determine that the wireless channel is occupied by another terminal, and thus may perform again channel sensing after waiting for a random backoff time. Meanwhile, when energy of less than a predetermined level is detected using the physical channel sensing scheme, the terminal may determine that the wireless channel is in an idle state, and may then access the corresponding wireless channel and transmit a signal through the wireless channel.

The virtual channel sensing scheme may be implemented by setting a predicted channel occupation time using a network allocation vector (NAV) timer. In the WLAN system, upon transmitting a frame, a communication entity may write the time required to complete the transmission of the corresponding frame in the duration field of the header of the frame. When normally receiving a certain frame through the wireless channel, the communication entity may set its own NAV timer based on a value in the duration field of the header of the received frame. When receiving a new frame before the NAV timer has expired, the communication entity may update the NAV timer based on the value in the duration field of the header of the newly received frame. When the NAV timer has expired, the communication entity may determine that the occupation of the wireless channel has been released, and may then contend for access to a wireless channel.

The communication entity may support multiple data rates of a physical layer depending on various modulation schemes and various channel coding rates. Generally, a high data rate for the physical layer enables a large amount of data to be transmitted during a short wireless channel occupation time, but requires high signal quality. In contrast, a low data rate for the physical layer enables data to be transmitted even at low signal quality, but requires a relatively long wireless channel occupation time.

Since the resources of the wireless channel are shared between communication entities, the overall capacity of the WLAN system may be increased only when the maximum amount of data is transmitted during the time for which a specific communication entity occupies the wireless channel. That is, the overall capacity of the WLAN system may be increased when the terminal transmits and receives data to and from the AP at the highest possible data rate for the physical layer. The highest data rate for the physical layer may be realized when signal quality is sufficiently secured owing to a short distance between the AP and the terminal. If the terminals are located far away from the AP, the data rate of the physical layer becomes low, thus resulting in the reduction of the overall capacity of the WLAN system.

In the WLAN system for providing a communication service to multiple sensor terminals located over a wide area, there may occur the case where data cannot be transmitted to the entire area using only the signal output of a single AP. That is, sensor terminals that cannot be supported with a communication service may be present. Meanwhile, since a low-power sensor terminal has low signal output, the range in which the WLAN system is capable of transmitting uplink data may be further narrowed.

In particular, since a terminal located in the coverage boundary of the AP exhibits poor signal quality, the terminal performs communication with the AP at a low data rate of the physical layer. Therefore, the overall capacity of the WLAN system is drastically decreased. Further, when using the low data rate of the physical layer, the low-power terminal must be awakened for a much longer time in order to transmit the same amount of data, thus increasing power consumption.

Figure 9:
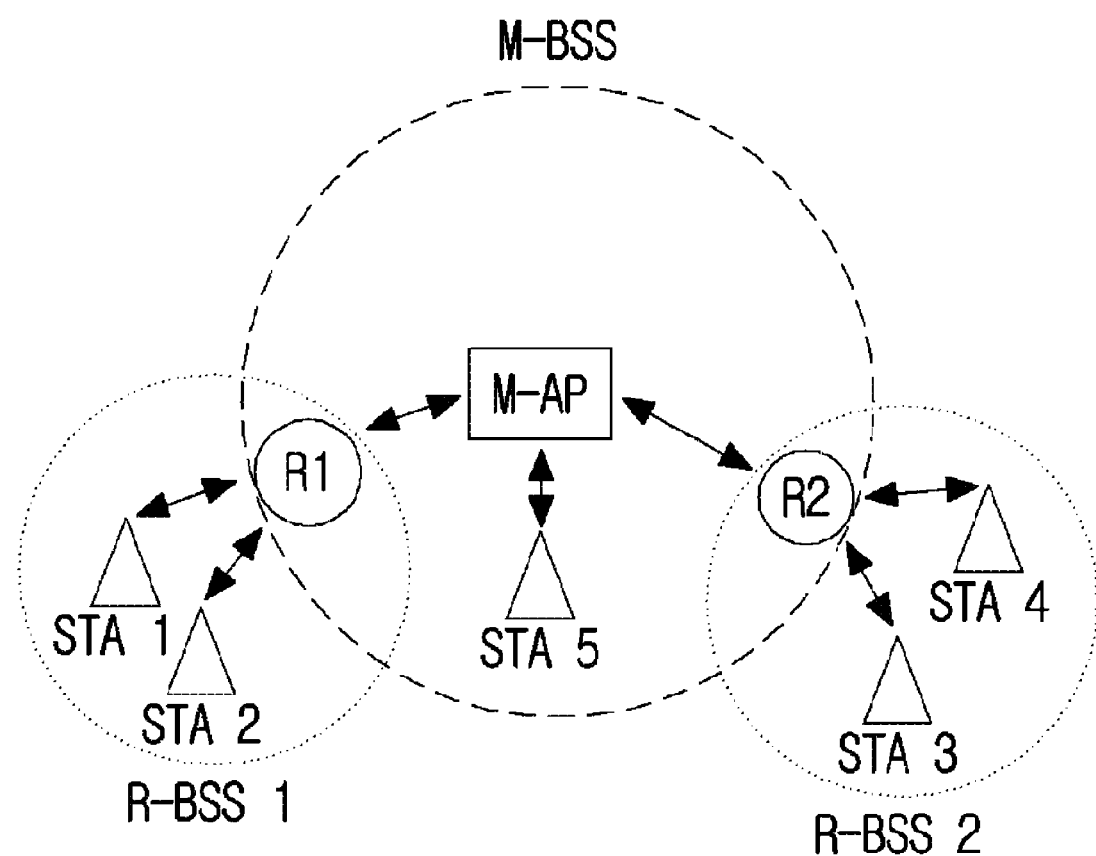
FIG. 9 is a conceptual diagram showing a WLAN system including relay devices.

FIG. 9 is a conceptual diagram showing a WLAN system including relay devices.

Referring to FIG. 9, a master access point (master-AP: M-AP), a first relay device R1, a second relay device R2, and a fifth terminal STA 5 may form a master BSS. The first relay device R1, a first terminal STA 1, and a second terminal STA 2 may form a first relay BSS. The second relay device R2, a third terminal STA 3, and a fourth terminal STA 4 may form a second relay BSS. The relay devices R1 and R2 may be located at the place where signal quality between the master access point (M-AP) and the terminals STA 1, STA 2, STA 3, and STA 4 is deteriorated. The first relay device R1 may relay data transmitted between the master access point (M-AP) and the first and second terminals STA 1 and STA 2. The second relay device R2 may relay data transmitted between the master access point (M-AP) and the third and fourth terminals STA 3 and STA 4. That is, the physical area of the master access point (M-AP) may be extended via the relay devices R1 and R2.

Figure 10:
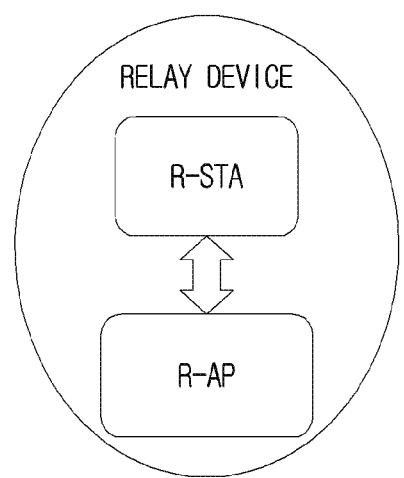
FIG. 10 is a block diagram showing the logical configuration of a relay device.

FIG. 10 is a block diagram showing the logical configuration of a relay device.

Referring to FIG. 10, the relay device may include a relay terminal (R-STA), functioning as a master access point (M-AP), and a relay access point (R-AP), functioning as an access point for terminals in an extended area.

The relay terminal (R-STA) may probe the master access point (M-AP) by receiving a beacon frame or a probe response frame transmitted from the master access point (M-AP) according to the same procedure as a normal terminal. Thereafter, the relay terminal (R-STA) may sequentially perform a procedure for authentication with the probed master access point (M-AP) and a procedure for association with the M-AP.

The relay terminal (R-STA) may relay data transmitted between the master access point (M-AP) and an end terminal. In this case, the relay terminal (R-STA) may relay data that is transmitted using a 4-address field. The 4-address field includes a destination address (DA) field indicating the address of the final destination of data, a source address (SA) field indicating the address of the place where the data was generated, a transmitter address (TA) field indicating the address of the communication entity that physically transmits a frame containing the data, and a receiver address (RA) field indicating the address of the communication entity that is to physically receive the frame containing the data.

For example, when desiring to transmit data to an end terminal via a relay device, the master access point (M-AP) may configure and transmit the header address field of a data frame as follows.

TA field: address of master access point (M-AP)(i.e. MAC address)
RA field: address of relay device (i.e. MAC address)
DA field: address of end terminal (i.e. MAC address)
SA field: address of master access point (M-AP)(i.e. MAC address)

The relay terminal (R-STA) may forward a data frame received from the relay access point (R-AP) to the master access point (M-AP), and may forward a data frame received from the master access point (M-AP) to the relay access point (R-AP).

When the relay terminal (R-STA) and the master access point (M-AP) are associated with each other and a transfer path is acquired, the relay access point (R-AP) may periodically transmit a beacon frame including an identifier (SSID) identical to that of the master access point (M-AP). Also, the relay access point (R-AP) may transmit a probe response frame in response to a probe request frame from the end terminal, transmit an authentication response frame in response to an authentication request frame from the end terminal, and transmit an association response frame in response to an association request frame from the end terminal. That is, the relay access point (R-AP) may perform the same function as the master access point (M-AP).

An end terminal located near the relay device may be associated to a relay-AP (R-AP) located closer to the end terminal than the master access point (M-AP) and may secure high signal quality, thus enabling data to be transmitted at a high data rate of the physical layer.

The relay access point (R-AP) may generate a beacon frame including an indicator indicating that the R-AP itself is a communication entity for relaying data transmitted between the master access point (M-AP) and the end terminal, and may transmit the generated beacon frame. Such an indicator may be defined either using one bit in the beacon frame or using the address field of the master access point (M-AP).

The relay access point (R-AP) may transmit a data frame to the end terminal using a 4-address field in the same way as the relay terminal (R-STA). Alternatively, the relay access point (R-AP) may transmit a data frame to the end terminal using a 3-address field (SA=TA, RA, and DA) when the SA field is identical to the TA field. Alternatively, the relay access point (R-AP) may transmit a data frame to the end terminal using a 2-address field (RA, TA). When a data frame is received from the end terminal via a 3-address field (SA=TA, RA, DA) or a 2-address field (RA, TA), the relay access point (R-AP) may transmit the corresponding data frame to the relay terminal (R-STA).

Figure 11:
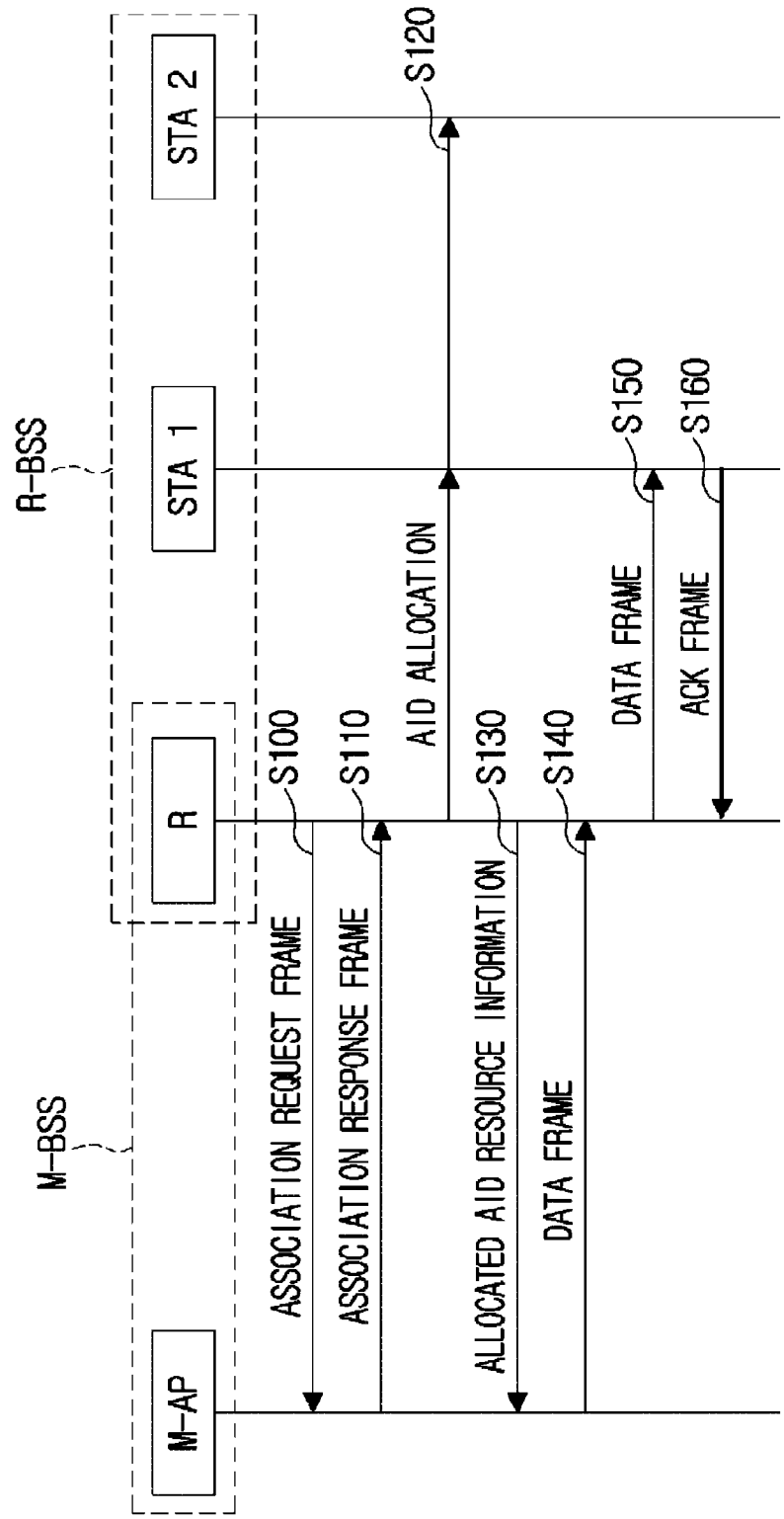
FIG. 11 is a flowchart showing a data transmission method according to an embodiment of the present invention.

FIG. 11 is a flowchart showing a data transmission method according to an embodiment of the present invention.

Referring to FIG. 11, a master access point (M-AP) may serve a master-BSS (M-BSS), and a relay device R may belong to the M-BSS. The relay device R may serve a relay-BSS (R-BSS) and a first terminal STA 1 and a second terminal STA 2 may belong to the R-BSS.

When a procedure for authentication with the master access point (M-AP) is completed, the relay device R may perform an association procedure. That is, the relay device R may transmit an association request frame to the master access point (M-AP) (S100). Here, the association request frame may include an indicator that requests the allocation of AID resources for terminals belonging to the R-BSS.

When the association request frame is received from the relay device R, the master access point (M-AP) may acquire the indicator included in the association request frame, and may then determine an AID resource allocation request for terminals belonging to the R-BSS based on the indicator. Therefore, the master access point (M-AP) may transmit an association response frame, including a reference AID to be used to allocate AIDs of the terminals belonging to the R-BSS, to the relay device R (S110). Here, the reference AID may denote the AID of the relay device R. Meanwhile, when an AID is hierarchically configured, as described above with reference to FIG. 5, the reference AID may be set on a page ID basis, a block index basis, or a sub-block index basis.

When the association response frame is received from the master access point (M-AP), the relay device R may allocate AIDs to the first terminal STA 1 and the second terminal STA 2 belonging to the R-BSS, based on the reference AID included in the association response frame (S120). For example, when the reference AID is set on a page ID basis, the relay device R may allocate different AIDs to the first terminal STA 1 and the second terminal STA 2 belonging to the R-BSS, within a page ID range indicated by the reference AID. When the reference AID is set on a block index basis, the relay device R may allocate different AIDs to the first terminal STA 1 and the second terminal STA 2 belonging to the R-BSS, within a block index range indicated by the reference AID. When the reference AID is set on a sub-block index basis, the relay device R may allocate different AIDs to the first terminal STA 1 and the second terminal STA 2 belonging to the R-BSS, within a sub-block index range indicated by the reference AID.

Figure 12:
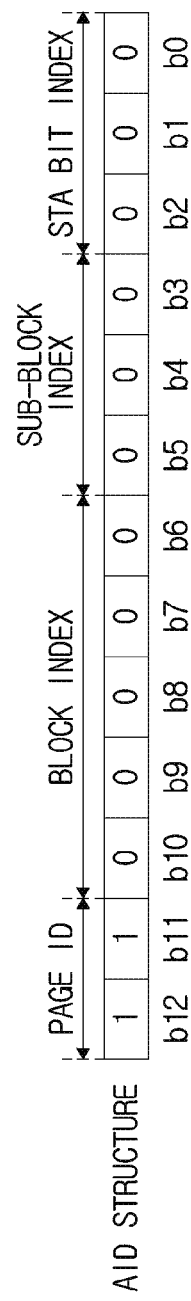
FIG. 12 is a block diagram showing an embodiment of an AID designated on a page ID basis.

FIG. 12 is a block diagram showing an embodiment of an AID designated on a page ID basis.

Referring to FIG. 12, a master access point (M-AP) may designate the range of AIDs for communication entities, belonging to an R-BSS, on a page ID basis. For example, the master access point (M-AP) may allocate '11 00000 000 000b' as the AID of a relay device R. In this case, the relay device R may allocate AIDs to terminals belonging to the R-BSS within the range of a page ID (i.e. page ID group 3(11b)) indicated by its own AID. That is, the relay device R may allocate AIDs to the terminals belonging to the R-BSS within the range of '11 00000 000 001b' to '11 11111 111 111b'. Meanwhile, the master access point (M-AP) may allocate the AIDs of other communication entities (e.g. a relay device, a terminal, and the like) belonging to the M-BSS within the range of page ID groups 0 to 2 (00b, 01b, 10b). According to this configuration, communication entities constituting a WLAN system may be identified using AIDs that are unique identifiers.

Figure 13:
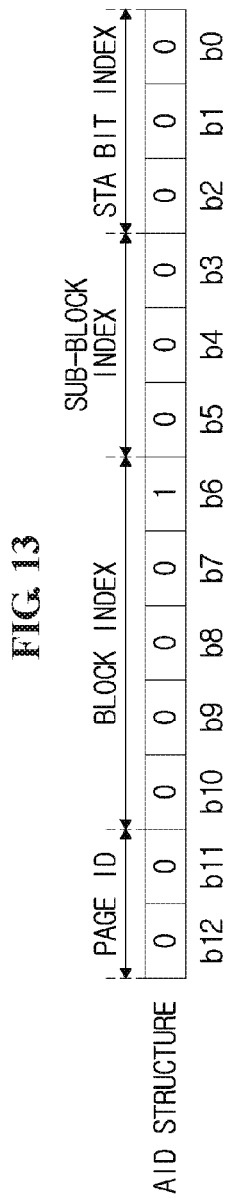
FIG. 13 is a block diagram showing an embodiment of an AID designated on a block index basis.

FIG. 13 is a block diagram showing an embodiment of an AID designated on a block index basis.

Referring to FIG. 13, a master access point (M-AP) may designate the range of AIDs for communication entities belonging to an R-BSS on a block index basis. For example, the master access point (M-AP) may allocate '00 00001 000 000b' as the AID of the relay device R. In this case, the relay device R may allocate AIDs to terminals belonging to the R-BSS within the range of a block index indicated by its own AID. That is, the relay device R may allocate AIDs to terminals belonging to the R-BSS within the range of '00 00001 000 001b' to '00 00001 111 111b'.

Figure 14:
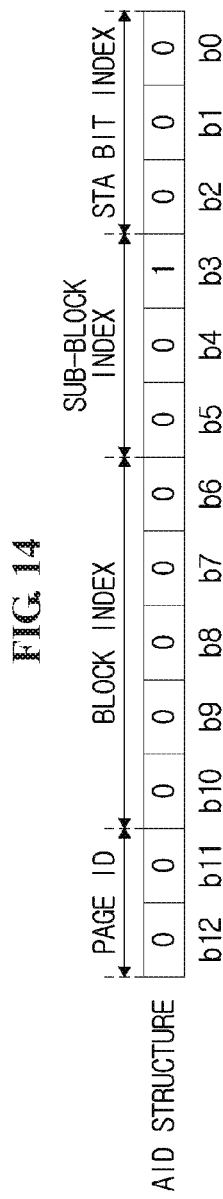
FIG. 14 is a block diagram showing an embodiment of an AID designated on a sub-block index basis.

FIG. 14 is a block diagram showing an embodiment of an AID designated on a sub-block index basis.

Referring to FIG. 14, a master access point (M-AP) may designate the range of AIDs for communication entities belonging to an R-BSS on a sub-block index basis. For example, the master access point (M-AP) may allocate '00 00000 001 000b' as the AID of the relay device R. In this case, the relay device R may allocate AIDs to terminals belonging to the R-BSS within the range of a sub-block index indicated by its own AID. That is, the relay device R may allocate AIDs to terminals belonging to the R-BSS within the range of '00 00000 001 001b' to '00 00000 001 111b'.

Referring back to FIG. 11, the relay device R may transmit information about AID resources allocated to the terminals belonging to the R-BSS to the master access point (M-AP) (S130). At this time, the relay device R may transmit the MAC addresses of terminals belonging to the R-BSS, together with information about the AID resources allocated to the corresponding terminals, to the master access point (M-AP). For example, the relay device R may transmit the AID and the MAC address of the first terminal STA 1 to the master access point (M-AP), and may transmit the AID and the MAC address of the second terminal STA 2 to the master access point (M-AP).

When there is a data frame to be transmitted to the first terminal STA 1, the master access point (M-AP) may configure an address field included in the corresponding data frame in the following manner.

First Embodiment of Address Field

RA field: MAC address of relay device R
TA field: MAC address of master access point (M-AP)
SA field: MAC address of master access point (M-AP)
DA field: MAC address of first terminal STA 1

Second Embodiment of Address Field

RA field: MAC address of relay device R
TA field: MAC address of master access point (M-AP)
SA field: MAC address of master access point (M-AP)
DA field: AID of first terminal STA 1

Third Embodiment of Address Field

RA field: AID of relay device R
TA field: MAC address of master access point (M-AP)
SA field: MAC address of master access point (M-AP)
DA field: MAC address of first terminal STA 1

Fourth Embodiment of Address Field

RA field: AID of relay device R
TA field: MAC address of master access point (M-AP)
SA field: MAC address of master access point (M-AP)
DA field: AID of first terminal STA 1

The master access point (M-AP) may transmit a data frame including the address field, configured in the above manner, to the relay device R (S140). When the data frame is received from the master access point (M-AP), the relay device R may recognize that the final destination of the data frame is the first terminal STA 1, via the address field included in the data frame. Therefore, the relay device R may transmit the data frame to the first terminal STA 1 (S150). Meanwhile, when the data frame that is transmitted from the relay device R to the first terminal STA 1 is acquired, the master access point (M-AP) may determine that the relay device R has successfully received the data frame. That is, the master access point (M-AP) may regard the data frame, which is transmitted from the relay device R to the first terminal STA 1, as an ACK frame for the data frame, which the M-AP has transmitted to the relay device R. Alternatively, when the data frame has been successfully received from the master access point (M-AP), the relay device R may transmit an ACK frame, as a response thereto, to the master access point (M-AP). When the data frame has been successfully received from the relay device R, the first terminal STA 1 may transmit an ACK frame, as a response thereto, to the relay device R (S160).

Figure 15:
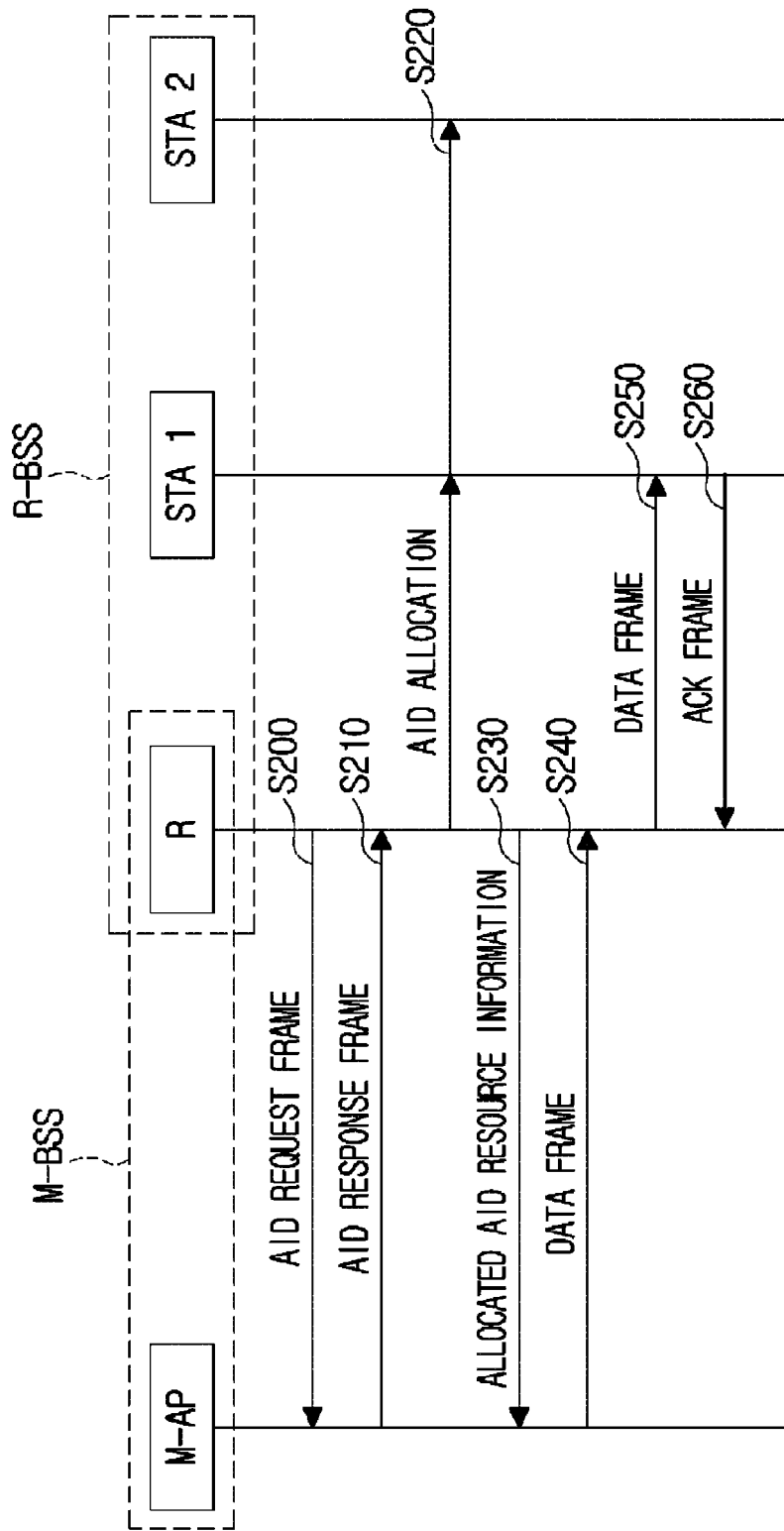
FIG. 15 is a flowchart showing a data transmission method according to another embodiment of the present invention.

FIG. 15 is a flowchart showing a data transmission method according to another embodiment of the present invention.

Referring to FIG. 15, a master access point (M-AP) may serve an M-BSS, and a relay device R may belong to the M-BSS. The relay device R may serve an R-BSS, and a first terminal STA 1 and a second terminal STA 2 may belong to the R-BSS.

After associating with the master access point (M-AP), the relay device R may transmit an AID resource request frame to the master access point (M-AP) so as to request the M-AP to allocate AID resources for terminals belonging to the R-BSS (S200). The AID resource request frame may include information about an indicator for requesting the allocation of AID resources for terminals belonging to the R-BSS and information about the size (or number) of AID resources, as shown in the following Table 1.

TABLE 1

| Order | Information |
| --- | --- |
| 1 | Indicator for requesting allocation of AID resources |
| 2 | Size (or number) of AID resources |

When the AID resource request frame is received, the master access point (M-AP) may acquire, from the AID resource request frame, information about the indicator for requesting the allocation of AID resources for terminals belonging to the R-BSS and the size (or number) of the AID resources. That is, by way of the AID resource request frame, the master access point (M-AP) may check the request to allocate AID resources for terminals belonging to the R-BSS and also check the size (or number) of required AID resources. The master access point (M-AP) may generate an AID resource response frame that includes information about AID resources for terminals belonging to the R-BSS, based on the information included in the AID resource request frame, and may transmit the AID resource response frame to the relay device R (S210).

The AID resource information for the R-BSS may be the range of AIDs to be used for terminals belonging to the R-BSS. Further, the AID resource information may be designated so that the range of AIDs does not overlap the range of AIDs to be used for terminals belonging to the M-BSS. For example, referring to FIG. 12 described above, information about AID resources may be designated on a page ID basis. In this case, the master access point (M-AP) may designate the range of '11 00000 000 001b' to '11 11111 111 111b' as the range of AIDs for terminals belonging to the R-BSS. Alternatively, referring to FIG. 13 described above, information about AID resources may be designated on a block index basis. In this case, the master access point (M-AP) may designate the range of '00 00001 000 001b' to '00 00001 111 111b' as the range of AIDs for terminals belonging to the R-BSS. Alternatively, referring to FIG. 14 described above, the AID resource information may be designated on a sub-block index basis. In this case, the master access point (M-AP) may designate the range of '00 00000 001 001b' to '00 00000 001 111b' as the range of AIDs for terminals belonging to the R-BSS.

The AID resource response frame may include information about an indicator indicating that AID resources for terminals belonging to the R-BSS are allocated, information indicating the start point of AIDs, and information about the size (or number) of AID resources, as shown in the following Table 2. The AID range may be defined by the start point of AIDs and the size (or number) of AID resources.

TABLE 2

| Order | Information |
|---|---|
| 1 | Indicator indicating allocation of AID resources |
| 2 | Start point of AIDs |
| 3 | Size (or number) of AID resources |

When the AID resource response frame is received from the master access point (M-AP), the relay device R may allocate AIDs to the first terminal STA 1 and the second terminal STA 2 belonging to the R-BSS, based on the AID resource information included in the AID resource response frame (S220). For example, when the range of AIDs received from the master access point (M-AP) is designated on a page ID basis, the relay device R may allocate different AIDs to the first terminal STA 1 and the second terminal STA 2 belonging to the R-BSS, within a designated page ID range. When the range of AIDs received from the master access point (M-AP) is designated on a block index basis, the relay device R may allocate different AIDs to the first terminal STA 1 and the second terminal STA 2 belonging to the R-BSS within a designated block index range. When the range of AIDs received from the master access point (M-AP) is designated on a sub-block index basis, the relay device R may allocate different AIDs to the first terminal STA 1 and the second terminal STA 2 belonging to the R-BSS within a designated sub-block index range.

The relay device R may transmit the information about AID resources allocated to the terminals belonging to the R-BSS to the master access point (M-AP)(S230). In this case, the relay device R may transmit the MAC addresses of the terminals belonging to the R-BSS, together with the information about AID resources allocated to the corresponding terminals, to the master access point (M-AP). For example, the relay device R may transmit the AID and the MAC address of the first terminal STA 1 to the master access point (M-AP), and may transmit the AID and MAC address of the second terminal STA 2 to the master access point (M-AP).

When there is a data frame to be transmitted to the first terminal STA 1, the master access point (M-AP) may configure the address field included in the corresponding data frame in the way described above according to the 'first embodiment of the address field', 'second embodiment of the address field', 'third embodiment of the address field' or 'fourth embodiment of the address field'. That is, the master access point (M-AP) may configure the DA field of the address field included in the data frame as the AID of the first terminal STA 1, or the RA field of the address field included in the data frame as the AID of the relay device R.

The master access point (M-AP) may transmit a data frame including the address field, configured in this way, to the relay device R (S240). When the data frame is received from the master access point (M-AP), the relay device R may recognize that the final destination of the data frame is the first terminal STA 1, via the address field included in the data frame. Therefore, the relay device R may transmit the data frame to the first terminal STA 1 (S250). Meanwhile, when the data frame that is transmitted from the relay device R to the first terminal STA 1 is acquired, the master access point (M-AP) may determine that the relay device R has successfully received the data frame. That is, the master access point (M-AP) may regard the data frame that is transmitted from the relay device R to the first terminal STA 1 as an ACK frame for the data frame, which the M-AP has transmitted to the relay device R. Alternatively, when the data frame has been successfully received from the master access point (M-AP), the relay device R may transmit an ACK frame, as a response thereto, to the master access point (M-AP).

When the data frame has been successfully received from the relay device R, the first terminal STA 1 may transmit an ACK frame, as a response thereto, to the relay device R (S260).

Figure 16:
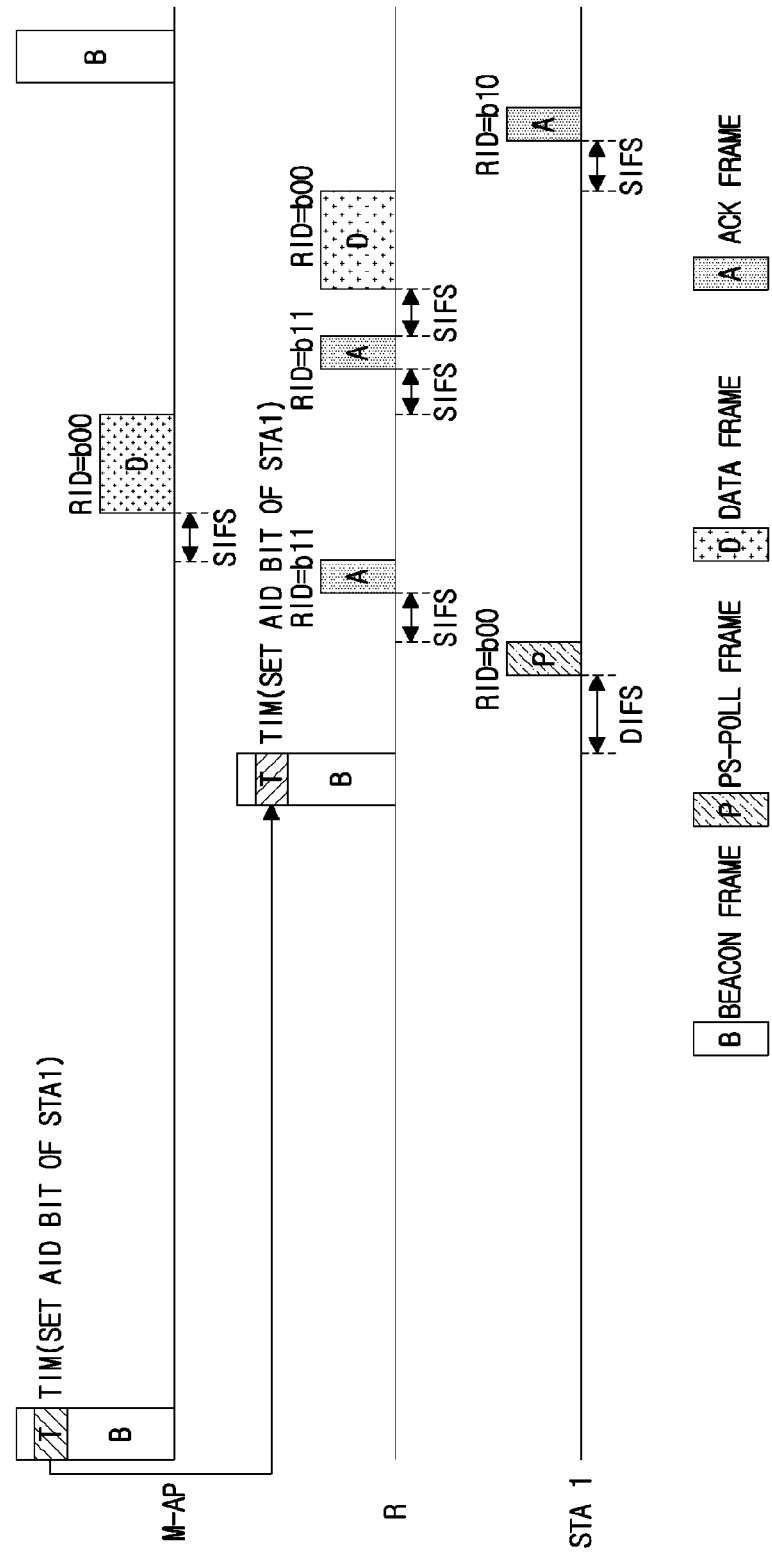
FIG. 16 is a conceptual diagram showing a data transmission method according to a further embodiment of the present invention.

FIG. 16 is a conceptual diagram showing a data transmission method according to a further embodiment of the present invention.

Referring to FIG. 16, a master access point (M-AP) may serve an M-BSS, and a relay device R may belong to the M-BSS. The relay device R may serve an R-BSS, and a first terminal STA 1 may belong to the R-BSS. Here, the AID of the relay device R may be allocated based on the AID allocation method, described above with reference to FIG. 11. The AID of the first terminal STA 1 belonging to the R-BSS may be allocated based on the AID allocation method, as described above with reference to FIG. 11 or the AID allocation method, described above with reference to FIG. 15.

When there is data to be transmitted to the first terminal STA 1, the master access point (M-AP) may set the AID bit of the first terminal STA 1 in a TIM so as to indicate the presence of the data, may generate a beacon frame including the TIM in which the AID bit of the first terminal STA 1 is set, and may transmit the generated beacon frame.

When the beacon frame is received from the master access point (M-AP), the relay device R may recognize that the AID bit of the first terminal STA 1 belonging to the R-BSS is set in the TIM included in the beacon frame, and may determine, based on the AID bit, that the data to be transmitted to the first terminal STA 1 is buffered in the master access point (M-AP). The relay device R may set the AID bit of the first terminal STA 1 in the TIM so as to provide notification that there is data to be transmitted to the first terminal STA 1, may generate a beacon frame including the TIM in which the AID bit of the first terminal STA 1 is set, and may transmit the generated beacon frame.

When the beacon frame is received from the relay device R, the first terminal STA 1 may recognize that its own AID bit is set in the TIM included in the beacon frame. That is, the first terminal STA 1 may be aware that data to be transmitted thereto is present. The first terminal STA 1 may request the transmission of data by transmitting a PS-Poll frame (or a trigger frame) to the relay device R. At this time, the first terminal STA 1 may indicate that an ACK frame is to be transmitted after the transmission of the PS-Poll frame (or the trigger frame) by setting the response indication deferral (RID) bit of a signal (SIG) field included in the PS-Poll frame (or the trigger frame) to 'b00'.

When the PS-Poll frame (or the trigger frame) is received from the first terminal STA 1, the relay device R may determine that the first terminal STA 1 has been awakened, and may then transmit an ACK frame as a response to the PS-Poll frame (or the trigger frame). At this time, the relay device R may indicate that a data frame is to be transmitted after the transmission of the ACK frame by setting the RID bit of the SIG field included in the ACK frame to 'b11'.

Meanwhile, the master access point (M-AP) cannot receive the PS-Poll frame (or the trigger frame) transmitted from the first terminal STA 1, but may receive an ACK frame transmitted from the relay device R as a response to the PS-Poll frame (or the trigger frame). Therefore, when the ACK frame transmitted from the relay device R is received, the master access point (M-AP) may determine that the first terminal STA 1 has been awakened, and may then transmit a data frame to the relay device R. Here, the master access point (M-AP) may indicate that an ACK frame is to be transmitted after the transmission of the data frame by setting the RID bit of the SIG field included in the data frame to 'b00'.

When the data frame has been successfully received, the relay device R may transmit an ACK frame, as a response thereto, to the master access point (M-AP). At this time, the relay device R may indicate that a data frame is to be transmitted after the transmission of the ACK frame by setting the RID bit of the SIG field included in the ACK frame to 'b11'.

Thereafter, the relay device R may transmit the data frame to the first terminal STA 1. At this time, the relay device R may indicate that an ACK frame is to be transmitted after the transmission of the data frame by setting the RID bit of the SIG field included in the data frame to 'b00'. When the data frame has been successfully received, the first terminal STA 1 may transmit an ACK frame to the relay device R. In this case, the first terminal STA 1 may indicate that no frames are to be transmitted after the transmission of the ACK frame by setting the RID bit of the SIG field included in the ACK frame to 'b10'.

Meanwhile, when desiring to transmit a data frame to terminals belonging to the R-BSS in a broadcast (or multicast) manner, the master access point (M-AP) may set a separate broadcast/multicast AID bit allocated to the relay device R, which serves the R-BSS, in a TIM. At this time, the AID allocated to the relay device R may replace the broadcast/multicast AID. The master access point (M-AP) may generate a beacon frame including the TIM in which the AID bit of the relay device R is set, and transmit the generated beacon frame. That is, the AID of the relay device R may be used as an indicator for broadcast (or multicast) transmission to the terminals belonging to the R-BSS.

When the beacon frame is received from the master access point (M-AP), the relay device R may recognize that its own AID bit is set in the TIM included in the beacon frame, and may determine, based on the AID bit, that data to be transmitted in a broadcast (or multicast) manner to the terminals belonging to the R-BSS is buffered in the master access point (M-AP). Therefore, the relay device R may set the AID bits of all terminals belonging to the R-BSS in the TIM, generate a beacon frame including the TIM in which the AID bits of all terminals belonging to the R-BSS are set, and transmit the generated beacon frame.

When the beacon frame is received from the relay device R, the terminals belonging to the R-BSS may recognize that their own AID bits are set in the TIM included in the beacon frame, and may determine, based on the AID bits, that data to be transmitted thereto is present. The terminals belonging to the R-BSS may request the relay device R to transmit data frames by transmitting PS-Poll frames (or trigger frames) to the relay device R.

When the PS-Poll frames (or the trigger frames) are received from the terminals belonging to the R-BSS, the relay device R may determine that the terminals belonging to the R-BSS have been awakened and may then transmit an ACK frame as a response to the PS-Poll frames (or the trigger frames).

Meanwhile, the master access point (M-AP) cannot receive the PS-Poll frames (or the trigger frames) transmitted from the terminals belonging to the R-BSS, but may receive the ACK frame transmitted from the relay device R as the response to the PS-Poll frames (or trigger frames). Therefore, when the ACK frame transmitted from the relay device R is received, the master access point (M-AP) may determine that the terminals belonging to the R-BSS have been awakened, and may then transmit a data frame to the relay device R.

When the data frame has been successfully received, the relay device R may transmit an ACK frame, as a response to the data frame, to the master access point (M-AP). Thereafter, the relay device R may transmit the data frame to the terminals belonging to the R-BSS in a broadcast (or multicast) manner.

In accordance with the present invention, a master access point may extend a service area via a relay device. Since a terminal may secure a good quality link via the relay device, data can be transmitted at high speed. That is, the relay device is used, and thus the efficiency of use of a wireless channel may be improved and the amount of power consumed by the terminal may be reduced.

Further, the master access point may directly manage the AID of an end terminal belonging to R-BSS. Therefore, when transmitting a data frame to the end terminal through the relay device, the master access point may easily set the AID of the end terminal in a TIM. The relay device may easily map the destination address of a data frame during a procedure for forwarding the data frame received from the master access point to the end terminal.

Furthermore, the AID of the relay device may be used as an indicator for broadcast (or multicast) transmission to end terminals belonging to the corresponding R-BSS. Therefore, the master access point may broadcast (or multicast) a data frame to the terminals belonging to the R-BSS using the AID of the relay device.

Furthermore, when the master access point transmits a data frame to an end terminal through the relay device, the AID of the relay device, instead of the MAC address of the relay device, may be used as the reception address (i.e. RA field) of the data frame, and thus the length of the data frame may be reduced.

Furthermore, when a data frame is transmitted to the end terminal via the relay device, the master access point may use the AID of the end terminal, instead of the MAC address of the end terminal, as the destination address (i.e. DA field) of the data frame, and thus the length of the data frame may be reduced.

The embodiments of the present invention may be implemented in the form of program instructions that are executable via various types of computer means, and may be recorded on a computer-readable medium. The computer-readable medium may include program instructions, data files, and data structures solely or in combination. Program instructions recorded on the computer-readable medium may have been specially designed and configured for the embodiments of the present invention, or may be known to or available to those who have ordinary knowledge in the field of computer software.

Examples of the computer-readable storage medium include all types of hardware devices specially configured to store and execute program instructions, such as read only memory (ROM), random access memory (RAM), and flash memory. The hardware devices may be configured to operate as one or more software modules in order to perform the operation according to embodiments of the present invention, and vice versa. Examples of the program instructions include machine language code, such as code created by a compiler, and high-level language code executable by a computer using an interpreter or the like.

Although the present invention has been described with reference to the embodiments, those skilled in the art will appreciate that the present invention can be modified and changed in various forms, without departing from the spirit and scope of the invention as disclosed in the accompanying claims.

The invention claimed is:

1. A method for data transmission for relaying frame transmissions using a relay device between a master access point and a terminal, wherein:
the master access point forms a master-basic service set (M-BSS) to serve a terminal, and
the relay device forms a relay-basic service set (R-BSS) to serve a terminal, and is associated with the master access point to relay frame transmissions between the master access point and a terminal belonging to the R-BSS, the method comprising:
receiving, by the relay device from the master access point, assignment of R-BSS association identifier (AID) resources to be allocated to a terminal associated to the R-BSS, and a reference AID, the reference AID being an AID of the relay device; and
allocating, by the relay device, an AID among the R-BSS AID resources to the terminal associated to the R-BSS, based on the reference AID of the relay device.

2. The data transmission method of claim 1, wherein the R-BSS AID resources do not overlap M-BSS AID resources to be allocated by the master access point to a terminal associated to the M-BSS.

3. The data transmission method of claim 1, wherein the receiving, from the master access point, the assignment of R-BSS AID resources further comprises:
transmitting, by the relay device, an association request frame that requests allocation of the R-BSS AID resources to the master access point; and
receiving, by the relay device, an association response frame including an R-BSS AID resource allocation response, as a response to the association request frame, from the master access point.

4. The data transmission method of claim 1, wherein the receiving, from the master access point, the assignment of R-BSS AID resources further comprises:
after the relay device has been associated with the master access point, transmitting an R-BSS AID resource request frame that requests allocation of the R-BSS AID resources to the master access point; and
receiving an R-BSS AID resource response frame, as a response to the R-BSS AID resource request frame, from the master access point.

5. The data transmission method of claim 1, wherein the receiving, from the master access point, the assignment of R-BSS AID resources further comprises
deriving, by the relay device, R-BSS AID resources using the reference AID.

6. The data transmission method of claim 5, wherein the deriving the R-BSS AID resources includes:
when the reference AID is set on a page ID basis, deriving a range of R-BSS AID resources allocated to the relay device within a page ID range indicated by the reference AID.

7. The data transmission method of claim 5, wherein the deriving the R-BSS AID resources includes:
when the reference AID is set on a block index basis, deriving a range of R-BSS AID resources allocated to the relay device within a block index range indicated by the reference AID.

8. The data transmission method of claim 5, wherein the deriving the R-BSS AID resources includes:
when the reference AID is set on a sub-block index basis, deriving a range of R-BSS AID resources allocated to the relay device within a sub-block index range indicated by the reference AID.

9. The data transmission method of claim 1, further comprising:
transmitting, by the relay device, information about an AID allocated to the terminal associated to the R-BSS and a medium access control (MAC) address of the terminal to the master access point.

10. The data transmission method of claim 9, further comprising:
receiving a data frame from the master access point; and
transmitting the data frame to a first terminal, when a source address (SA) field included in the data frame indicates a MAC address of the master access point, a destination address (DA) field indicates a MAC address of the first terminal belonging to a BSS of the relay device, a receiver address (RA) field indicates an AID of the relay device, and a transmitter address (TA) field indicates a MAC address of the master access point.

11. The data transmission method of claim 9, further comprising:
receiving a data frame from the master access point; and
transmitting the data frame to a first terminal, when an SA field included in the data frame indicates a MAC address of the master access point, a DA field indicates an AID of the first terminal belonging to a BSS of the relay device, an RA field indicates a MAC address of the relay device, and a TA field indicates a MAC address of the master access point.

12. The data transmission method of claim 9, further comprising:
receiving a data frame from the master access point; and
transmitting a data frame to a first terminal, when an SA field included in the data frame indicates a MAC address of the master access point, a DA field indicates an AID of the first terminal belonging to a BSS of the relay device, an RA field indicates an AID of the relay device, and a TA field indicates a MAC address of the master access point.

* * * * *